(12) United States Patent
Gibson

(10) Patent No.: US 7,705,337 B2
(45) Date of Patent: Apr. 27, 2010

(54) SYSTEM AND METHOD FOR IMAGE DETECTION USING LARGE AREA PIN DIODE

(75) Inventor: Gregory T. Gibson, Snohomish, WA (US)

(73) Assignee: Microvision, Inc., Redmond, WA (US)

( * ) Notice: Subject to any disclaimer, the term of this patent is extended or adjusted under 35 U.S.C. 154(b) by 1197 days.

(21) Appl. No.: 11/280,927

(22) Filed: Nov. 16, 2005

(65) Prior Publication Data

US 2007/0108282 A1    May 17, 2007

(51) Int. Cl.
    *G06K 7/10* (2006.01)
(52) U.S. Cl. .............................. 250/559.06; 250/370.14
(58) Field of Classification Search ............ 250/559.06, 250/370.14
    See application file for complete search history.

(56) References Cited

U.S. PATENT DOCUMENTS

| | | | | |
|---|---|---|---|---|
| 5,144,120 | A | 9/1992 | Krichever et al. ............ 235/472 |
| 5,376,798 | A * | 12/1994 | Pettit ...................... 250/370.14 |
| 5,467,104 | A | 11/1995 | Furness, III et al. ............ 345/8 |
| 5,629,790 | A | 5/1997 | Neukermans et al. ........ 359/198 |
| 6,140,979 | A | 10/2000 | Gerhard et al. .................. 345/7 |
| 6,245,590 | B1 | 6/2001 | Wine et al. ..................... 438/52 |
| 6,285,489 | B1 | 9/2001 | Helsel et al. ................. 359/291 |
| 6,331,909 | B1 | 12/2001 | Dunfield ...................... 359/199 |
| 6,362,912 | B1 | 3/2002 | Lewis et al. .................. 359/204 |
| 6,384,406 | B1 | 5/2002 | Wine et al. .................... 250/234 |
| 6,433,907 | B1 | 8/2002 | Lippert et al. ................. 359/201 |
| 6,512,622 | B2 | 1/2003 | Wine et al. .................... 359/199 |
| 6,515,278 | B2 | 2/2003 | Wine et al. .................... 250/234 |
| 6,515,781 | B2 | 2/2003 | Lewis et al. ................... 359/204 |
| 6,525,310 | B2 | 2/2003 | Dunfield ...................... 250/235 |
| 6,690,888 | B1 * | 2/2004 | Keller et al. ................. 398/129 |
| 2002/0141026 | A1 | 10/2002 | Wiklof et al. ................ 359/212 |

OTHER PUBLICATIONS

"Low Noise, High Slew Rate, Unity Gain Stable Voltage Feedback Amplifier (THS4271)," *Texas Instruments Incorporated*, Jul. 2002, revised, Jan. 2004 (38 pgs).

* cited by examiner

Primary Examiner—Seung C Sohn
(74) Attorney, Agent, or Firm—Kevin D. Wills

(57) ABSTRACT

A photo-detector circuit for barcode scanners, endoscopes, and the like, includes a large area PIN photo-diode and an amplifier. Adverse effects associated with a terminal capacitance from the large area PIN diode may be minimized by maintaining a relatively constant voltage across the input terminals of the amplifier. Noise levels may be minimized by the arrangement of the amplifier circuit and the large area PIN diode resulting in an increased signal-to-noise ratio and an increased gain-bandwidth product. Due to the large numerical aperture of the photo-detector, increased resolution and/or lower output power in a reflective imaging system may be obtained with relatively low cost components. Detection area of the large area PIN diode may be larger than approximately 25 mm$^2$ when compared to typical PIN diodes used in photo-detector applications.

18 Claims, 8 Drawing Sheets

SYSTEM AND METHOD FOR IMAGE DETECTION USING LARGE AREA PIN DIODE

FIELD OF THE INVENTION

The present disclosure generally relates to scanned beam image capture. More particularly, the present disclosure relates to a detection method and device that employs a large area Positive-Intrinsic-Negative (PIN) photo-diode for light detection.

BACKGROUND

Scanned beam image capture devices are used for a variety of applications. In a scanned beam image capture device, a narrow beam of light is generated, often by a laser, and scanned across a field-of-view. Light from the beam is scattered, transmitted, absorbed, or reflected by features in the field-of-view according to the optical properties encountered by the beam as it scans. A portion of light from the scanned beam is "scattered" or "reflected" back to a photo-detector. The photo-detector converts the optical signal to an electrical signal. The electrical signal is used by a controller to determine one or more characteristics of the field-of-view, for example to generate an image of the field-of-view, to decode an optical indicia within the field-of-view, etc.

While terms such as "scattered" or "reflected" are used herein to describe light returned to the photo-detector, it should be understood that a variety of mechanisms may be involved in returning light to the photo-detector. The amount of light instantaneously received by the photo-detector is correlated to an instantaneous beam angle or position (which may be the same instant of time as the light being received or, for example in the case of fluorescence imaging, may be a function of one or more prior instants in time). By correlating beam position to the amount of light received by the detector, an image or other characteristic of the field-of-view may be determined.

A variety of electrical circuits, optics, and electro-optical systems have been developed for the purposes of photo detection. For many applications, small area PIN diodes are used as photo-detectors in scanned beam capture systems because of their low terminal capacitance. The terminal capacitance of the PIN diode affects the performance of the PIN diode as a photo-detector. A low terminal capacitance results in lower noise and therefore provides a higher signal-to-noise ratio. This in turn means that the low terminal capacitance PIN diode is often considered to have higher bandwidth that can be used with faster throughput. Avalanche Photo-Diodes (APDs) may also be employed as photo-detectors. However, APDs generally require higher bias voltages (~1-2 kV) and are more expensive than PIN diodes. Relatively large area PIN diodes have been avoided in the past due to their perceived higher capacitance and resulting increased noise level.

In relatively high scan rate beam scanning systems, small area diode devices have been used as photo-detectors because they provide a low terminal capacitance. The low terminal capacitance results in a high gain-bandwidth product and a fast throughput. However, due to relatively small numerical apertures of small area diode devices, overall sensitivity of the small area diode devices may be restricted due to limited light collection. Alternatively, relatively complex optics may be used to de-scan the returned light and focus it onto a small photo-diode, but this may add cost and complexity to a product.

Embodiments of the present disclosure provide improvements over the prior art.

BRIEF DESCRIPTION OF THE DRAWINGS

Non-limiting and non-exhaustive embodiments of the present invention are described with reference to the following drawings.

DETAILED DESCRIPTION

Figure 1A:
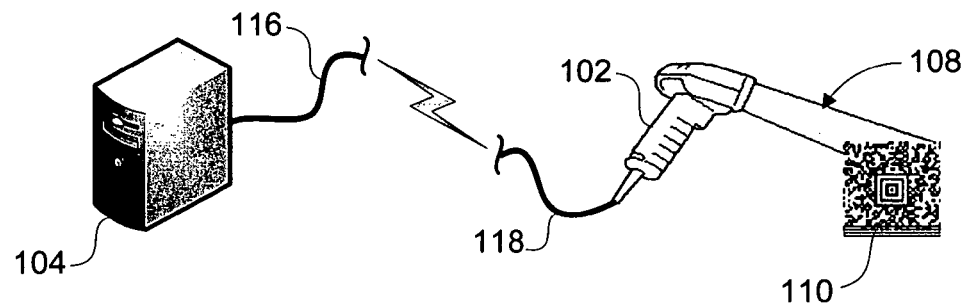
FIG. 1A is an illustration of an environment where a barcode scanning device according to one embodiment may be used.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

One aspect of the present disclosure generally relates to a photo detection circuit using a large area photo-diode for light detection. The described embodiments allow for higher bandwidth detection than would previously have been delivered from a system using a photo-diode having the relatively high terminal capacitance that is characteristic of a relatively large area photo-diode.

Another aspect of the present disclosure relates to a high bandwidth scanned beam image capture apparatus that uses a large area photo-diode. Examples of such apparatuses include photo-detectors, linear barcode and 2D barcode readers, medical imaging devices such as endoscopes, as well as other scanned beam image capture devices.

According to one embodiment, a photo-detector circuit for barcode scanners, endoscopes, and the like, includes a large area photo-diode such as a positive-intrinsic-negative (PIN) photo-diode and a trans-impedance amplifier. Adverse effects associated with a terminal capacitance from the large area PIN diode are minimized by maintaining a relatively constant voltage across the input terminals of the amplifier. This is accomplished by balancing the terminal capacitance of the photo-diode against the capacitance of the trans-impedance amplifier and by using an operational amplifier (op-amp) that has low input capacitance and a high gain-bandwidth product. This results in a relatively high proportion of system gain being associated with the relatively large active area of the PIN photodiode and a relatively lower proportion of system gain being associated with the first stage trans-impedance amplification. Noise levels are minimized by the balanced capacitance of the photo-diode and the trans-impedance amplifier, resulting in an increased signal-to-noise ratio. Because of the large active area of the PIN diode, it is possible to provide a large numerical aperture light collection. In turn, this may be used to improve light gathering efficiency, increase the size of the field-of-view, simplify or eliminate collection optics, simplify or eliminate the necessity for de-scanning collected light, and/or achieve other advantages.

According to some embodiments, the detection or active area of a large area photo-diode may be larger than approximately 25 mm$^2$ for many applications having bandwidth requirements greater than about 1 MHz.

Illustrative Operating Environments

Figure 1B:
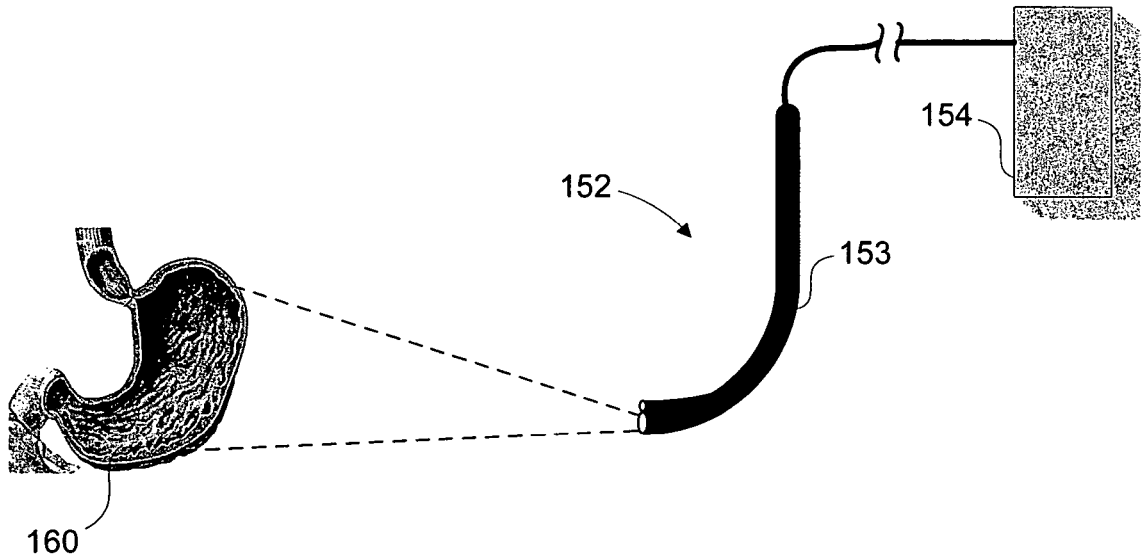
FIG. 1B is an illustration of an environment where an endoscope according to another embodiment may be used.

FIGS. 1A and 1B illustrate example operating environments where at least one embodiment of a photo-detector device may be implemented according to the present disclosure.

Referring to FIG. 1A, barcode scanning device 102 is used to read 2D barcodes such as barcode 110. Barcode scanning device 102 is arranged to illuminate barcode 110 with a scanned light beam (108) over a desired field-of-view. Light that is reflected from the barcode symbol is received by barcode scanning device 102 and converted into one or more signals that correspond to a barcode pattern that is associated with the barcode symbol. The signals are communicated to a processing device (104) through a physically wired connection or a wireless connection (116 and 118). Processing device 104 is arranged to evaluate the signals to identify information that is encoded in the barcode symbol, and to perform other data logging and data processing functions as may be necessary. Alternatively, some or all of the processing functions associated with processing device 104 may be included within barcode scanning device 102.

Barcode scanning device 102 may be powered by: an internal power source such as a battery, an external power source, a mechanically generated energy (e.g., pressure exerted on a trigger mechanism), a solar generated energy, and the like. Barcode scanning device 102 may employ Light Emitting Diodes (LEDs), Laser Diodes (LDs), and the like, to provide the light beam. The light beam may be scanned by mechanical means such as a Micro Electro-Mechanical System (MEMS) or by electrical means such as an electronically cycled diode array that is configured to provide scanned light beam 108. Example MEMS devices are described in further detail in U.S. Pat. No. 5,629,790 to Neukermans et al., which is hereby incorporated by reference.

Barcode scanning device 102 may be arranged in communication with processing device 104 through any appropriate communication medium including but not limited to a wired communication medium, a wireless communication medium, an infrared (IR) communication medium, to name a few. Processing device 104 may be a server located within a host computer system such as may be used for data logging, inventory control, price costing analysis or any other processing or data logging operations. In one example, processing device 104 is contained in a user-worn (e.g., on a belt clip) data logging apparatus. In another example, processing device 104 is located within a computer system that is accessible over a network, host-client, or point-to-point computer system such as a wired network (e.g., local area network, wide area network, Ethernet, etc.) or wireless network (e.g., 802.11 a/b/g/n, Bluetooth, IR, etc.).

Referring to FIG. 1B, scanned beam endoscope 152 is employed for optical examination of bodily canals, hollow organs such as stomach 160, insufflated surgical volumes, etc. Scanned beam endoscope 152 may be further arranged to perform a biopsy or to deliver localized medication, irradiation chemicals, and the like. Scanned beam endoscope 152 may include a flexible tip 153, which may includes a fiber-optic illumination fiber, collimating and/or objective lenses, a MEMS scanner, collection optics, and detection fibers; and a controller console 154. Several embodiments of scanned beam endoscopes are described in U.S. patent application Ser. No. 10/873,540, entitled SCANNING ENDOSCOPE, by Wiklof et al.; which is hereby incorporated by reference.

Figure 1C:
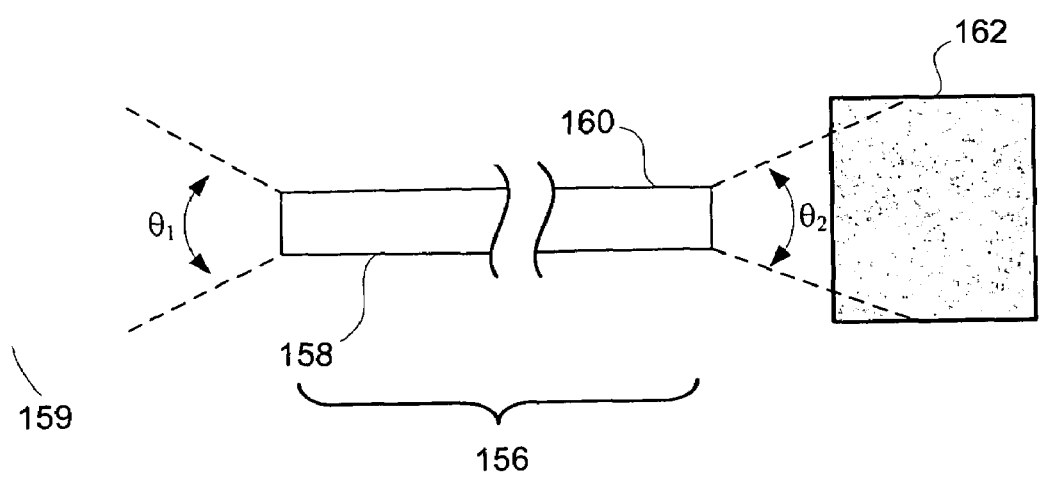
FIG. 1C is a diagram showing the relationship between fiber-optic light collection and the size of a photo-detector according to an embodiment.

FIG. 1C illustrates a relationship between the field-of-view of the endoscope tip and the size of a photo-detector. A detection optical fiber or bundle of detection optical fibers 156 includes a distal end 158 and a proximal end 160. Distal end 158 is aligned to receive scanned light scattered from the field-of-view 159. Proximal end 160 is aligned to deliver the received scanned light to a photo-detector 162. Frequently, it is desirable to use one or more multi-mode optical fibers as detection fibers. Optical fibers are characterized by a numerical aperture related to the angle, $\theta_1$ over which they will accept light.

Generally, the acceptance angle $\theta_1$ is substantially equal to the divergence angle $\theta_2$ over which transmitted light exits the optical fiber. For some applications, it is advantageous for the distal end 158 of a collection optical fiber or bundle of collection optical fibers 156 to accept light over a relatively large acceptance angle $\theta_1$. Thus, it is also advantageous for a photo-detector 162 to accept a large proportion of the light from a relatively large divergence angle $\theta_2$ at the proximal end 160 of a detection optical fiber or bundle of detection optical fibers 156.

While FIG. 1C illustrates a photo-detector that is coupled to a field-of-view 159 through a collection optical fiber or a bundle of collection optical fibers 156, a similar relationship exists for more directly coupled photo-detectors such as a staring photo-detector or a descanner-coupled photo-detector. For some applications, it is advantageous to use a larger photo-detector active surface. This may extend to photo-detectors that receive light energy through collection optics.

General Discussion of Example Systems

Figure 2:
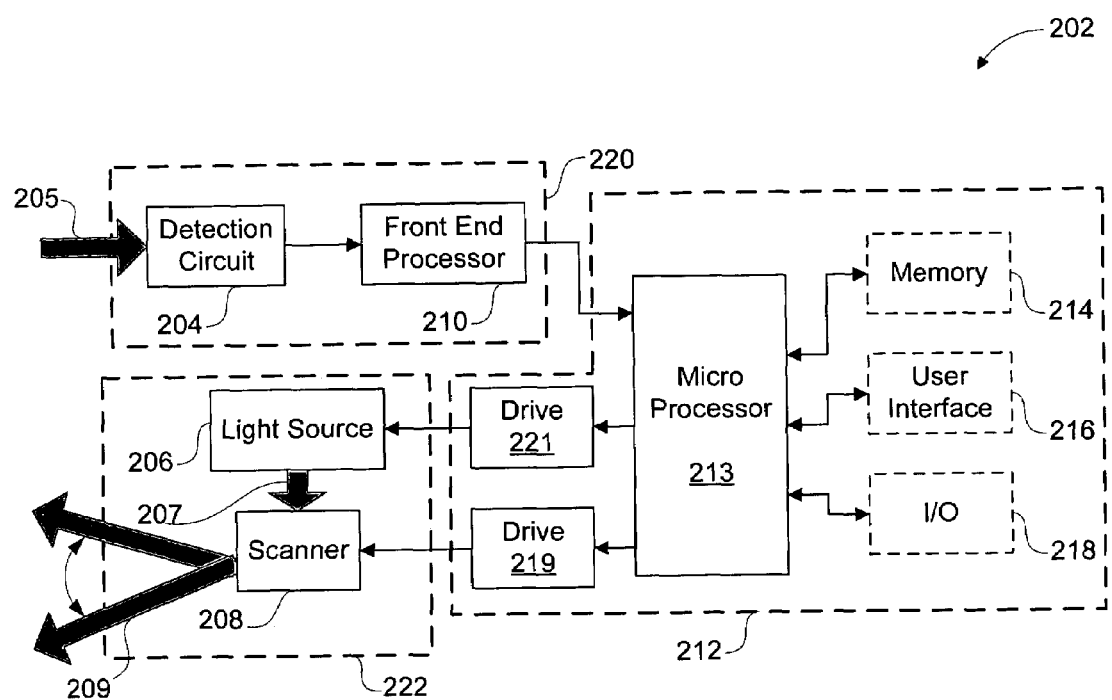
FIG. 2 is a block diagram of a scanned beam image capture device such as the barcode scanner of FIG. 1A or the scanned beam endoscope of FIGS. 1B and 1C according to embodiments.

FIG. 2 is a block diagram of an exemplary scanned beam image capture device. Scanned beam image capture device 202 may be a 2D barcode imager such as barcode scanning device 102 of FIG. 1A, a scanned beam endoscope such as the scanned beam endoscope of FIGS. 1B and 1C, or some other scanned beam image capture device. Scanned beam image capture device 202 includes photo detection block 220, controller block 212, and scan engine 222. Controller block 212 includes conventional constituents such as microprocessor 213, optional memory block 214, optional user interface block 216, optional input/output (I/O) block 218, scanner driver 219, and light source driver 221.

Scan engine 222 is arranged to provide a scanned light beam to a target object in a field-of-view such as, for example, a 2D barcode. Photo detection block 220 is arranged to receive reflected light 205 from the field-of-view and provide one or more electrical signals to controller block 212. Controller block 212 is arranged to provide one or more electrical signals to scan engine 222 to control scanning operations, and also arranged to process electrical signals that are received from photo detection block 220, where the electrical signals are associated with light that is reflected from the target object in the field-of-view. Controller block 212 may also be arranged to communicate with other devices (not shown) through optional I/O block 218.

Scan engine 222 includes a light source 206, which may for example be a laser, and a beam scanner 208, which may for example be a MEMS scanner. Scan engine 222 is arranged to provide the scanned light beam 209 to a field-of-view. In some cases, scan engine 222 may include physically disparate components. For example light 207 from light source 206 may be coupled through an optical fiber from a proximal location such as a control console to a distal location such as an endoscope imaging tip; where beam scanner 208 is located at the distal imaging tip. Alternatively scanned beam 209 may be coupled to the field-of-view remotely, such as through a bundle of optical fibers. In some cases, scan engines such as scan engine 222 are constructed to include an integrated detection block 220, integrated drivers 219 and 221, and/or an integrated microprocessor.

In one embodiment, light source 206 may be a laser diode. Alternatively, light source 206 may include a plurality of light sources such as a plurality of laser diodes. The light beam from the laser diode is coupled to beam scanner 208, which is configured to provide a scanning beam 209 across the field-of-view. Beam scanner 208 may be a mechanically oscillated mirror or an array of mirrors 208 such that the light beam scans the target object with scanned beam 209 along at least one axis to produce a one dimensional (1D) field-of-view. In a 2D barcode application, for example, the scanning beam 209 may be scanned along multiple axes. Often, it has been found advantageous to arrange two axes substantially orthogonal to one another, such as a horizontal axis and a vertical axis.

In some embodiments, light sources such as an LED, an array of LEDs, etc. may be employed as light source 206. A scanned beam may be substantially monochromatic. Alternatively, the scanned beam may include multiple wavelengths such as, for example, red, green and blue (RGB). Example wavelengths may include visible light or non-readily-visible light such as, for example, infrared wavelengths and ultraviolet wavelengths. Scanning of the beam may be accomplished in a variety of ways. For example a phased array of coherent light sources such as that described in U.S. Pat. No. 5,467,104 by Furness et al., which is hereby incorporated by reference; or a light source scanner such as that described in U.S. Pat. No. 5,144,120 by Krichever et al., which is also hereby incorporated by reference; may be used. Alternatively, a beam deflector may be used. Some embodiments of a spinning polygon beam deflector are described in U.S. patent application Ser. No. 10/007,784 by Wiklof et al., which is hereby incorporated by reference. Some embodiments of a MEMS scanner beam deflector are described in U.S. Pat. No. 6,140,979, entitled SCANNED DISPLAY WITH PINCH, TIMING, AND DISTORTION CORRECTION; U.S. Pat. No. 6,245,590, entitled FREQUENCY TUNABLE RESONANT SCANNER AND METHOD OF MAKING; U.S. Pat. No. 6,285,489, entitled FREQUENCY TUNABLE RESONANT SCANNER WITH AUXILIARY ARMS; U.S. Pat. No. 6,331,909, entitled FREQUENCY TUNABLE RESONANT SCANNER; U.S. Pat. No. 6,362,912, entitled SCANNED IMAGING APPARATUS WITH SWITCHED FEEDS; U.S. Pat. No. 6,384,406, entitled ACTIVE TUNING OF A TORSIONAL RESONANT STRUCTURE; U.S. Pat. No. 6,433,907, entitled SCANNED DISPLAY WITH PLURALITY OF SCANNING ASSEMBLIES; U.S. Pat. No. 6,512,622, entitled ACTIVE TUNING OF A TORSIONAL RESONANT STRUCTURE; U.S. Pat. No. 6,515,278, entitled FREQUENCY TUNABLE RESONANT SCANNER AND METHOD OF MAKING; U.S. Pat. No. 6,515,781, entitled SCANNED IMAGING APPARATUS WITH SWITCHED FEEDS; and/or U.S. Pat. No. 6,525,310, entitled FREQUENCY TUNABLE RESONANT SCANNER; all hereby incorporated by reference. Other examples of beam deflectors include a galvanometer, a voice-coil mirror, a scanning or oscillating lens, and a moving diffraction element.

Controller block 212 is arranged to: receive electrical signals that are associated with detected light from photo detection block 220, process the received electrical signals, control scan engine 222, and communicate with other devices through optional I/O 218. An example controller block 212 may include, for example, a digital signal processor (DSP), a general purpose processor such as a microprocessor, a microcontroller, a complex instruction set (CISC) processor, or a reduced instruction set processor (RISC), an application specific integrated circuit (ASIC), a programmable logic device (PLD), or any other circuit blocks that are arranged to provide necessary image processing and control functions. In one example embodiment, barcode scanning device 202 may include optional memory block 214 and user interface block 216. For this example embodiment, controller block 212 may be arranged to store data. Controller block 212 may include further capabilities such as analysis of the received electrical signals.

Optional memory block 214 may be volatile or non-volatile memory. Optional memory block 214 may be implemented as an EPROM, EEPROM, RAM, DRAM, SRAM, SDRAM, DDR SDRAM, flash memory, and the like. Optional user interface block 216 may include a mechanical trigger, an optical trigger, a keyboard or a keypad configured to communicate instructions to image processor block 212, and the like. Optional I/O block 218 may represent an interface for a communication medium between image processor 212 and an external device. Such communication media may include wired, wireless, IR, and other communication systems. For example, for wired communication, optional I/O 218 may include a serial port, a parallel port, a low voltage differential signaling (LVDS) port, a Universal Serial Bus (USB) interface, an Ethernet interface, a Firewire interface (IEEE 1394), and the like. Example wireless communications may include proprietary wireless communication protocols or standard wireless communication protocols such as IEEE 802.11a/b/c/n "Wi-Fi" communications, Bluetooth communications, and the like.

Photo detection block 220 includes detection circuit 204 and optional front-end processor 210. Detection circuit 204 may include one or more large area photo-diodes that have characteristics suitable for use with other system components for scanned beam imaging applications. An example front-end processor 210 may be operable to perform first stage processing on the electrical signals received from detection circuit 204 in response to received light from the field-of-view. An example first stage processor may include one or more of: an amplifier circuit, a filter circuit, a peak detector circuit, a limiter circuit, an averaging circuit, a digitizing circuit, a decoder circuit, etc.

According to one embodiment, detection circuit 204 is implemented to include a large area PIN photo-diode. In this example, low noise levels can be maintained by isolating the effects of the terminal capacitance associated with the large area PIN diode from other circuits (e.g., the front end processor circuit). The noise effects from the terminal capacitance of the large area PIN diode are isolated from the other circuits by maintaining a substantially constant voltage across the large area PIN diode.

In some embodiments, a single large area PIN photo-diode is used in detection circuit 204. In other embodiments, a plurality of large area PIN photo-diodes may be used in detection circuit 204. In still another embodiment, one or more large area PIN photo-diodes may be combined with other types of light detection devices in detection circuit 204. For example, in an RGB system, received light 205 may be filtered to remove one or more wavelengths prior to impinging upon the surface of the photo-diode. Separate large area PIN photo-diodes may then be used to measure each wavelength or combinations of wavelengths. In other applications, for example in combined RGB and fluorescence imaging, one light signal may include significantly greater or fewer photons than another light signal. In the example of high attenuation fluorescence imaging, the fluorescence signal may be very weak so a large area PIN photo-diode may be used to measure RGB light and a high intrinsic gain and/or high photonic efficiency device such as an avalanche photo-diode or a photo multiplier tube may be used to detect the fluorescence signal. In other embodiments photo-diode size may be matched in a manner corresponding to the photon conversion efficiency of each wavelength. In still other embodiments, a range of photo-diode sizes and/or types may be matched to the instantaneous, line, or frame-related strength of the received signal; for example a larger area or higher gain device being enabled or selected for lower power signals and smaller area or smaller gain devices being enabled or selected for higher power signals. Thus, a large area PIN photo-diode may be combined with a large variety of other types of photo-detectors to produce appropriate performance; meet cost, packaging, or other product constraints; or otherwise produce desired effects. According to some embodiments, the large area PIN diode is operated with a bias voltage between about 40V and about 200V. According to another embodiment, the large area PIN diode is operated with a bias voltage between about 50V and about 100V.

FIG. 2 represents an example partial block diagram for a scanned beam image capture device. Other embodiments including fewer or more blocks such as a digitizer, a decoder, and the like, may be implemented without departing from the spirit and scope of the present disclosure. Moreover, the various functions, circuits, blocks, and features described for each of the blocks (212, 220, 222, etc.) described with respect to FIG. 2 may be combined or separated, either logically or physically, as may be desired in a specific implementation.

Figure 3A:
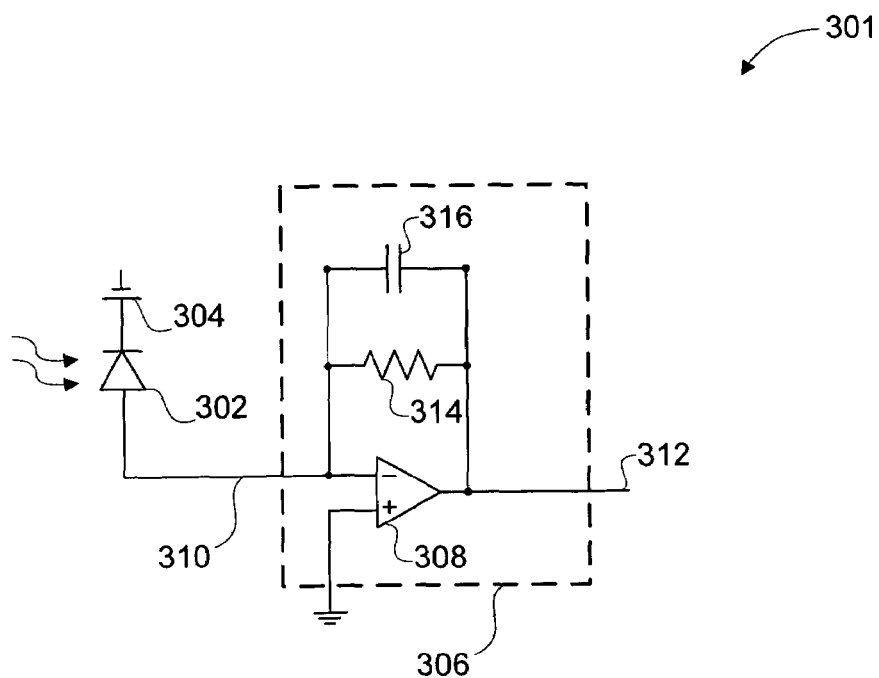
FIG. 3A schematically illustrates the photo detection block of FIG. 2 according to an embodiment.
Figure 3B:
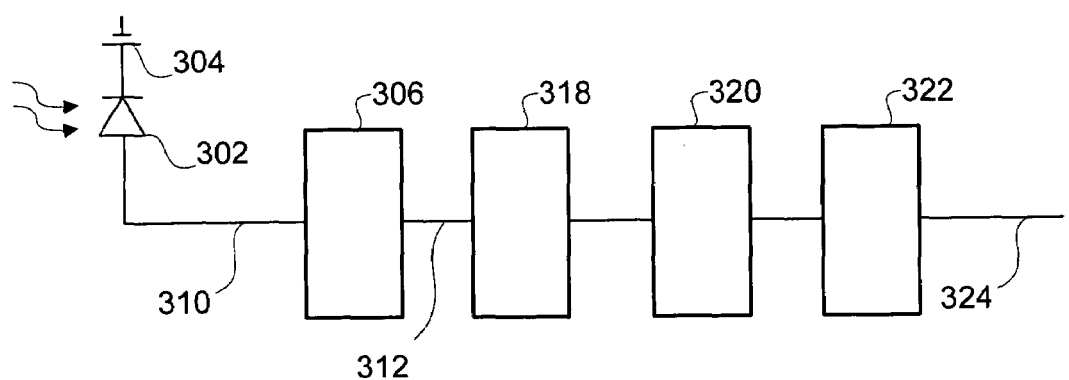
FIG. 3B illustrates a series of amplification stages according to an embodiment.

FIGS. 3A and 3B are schematic examples of a photo detection block corresponding to photo detection block 220 of FIG. 2A.

FIG. 3A is a schematic of a circuit 301 according to an embodiment. A relatively high terminal capacitance photo-diode 302, which in some embodiments is a large area PIN photo-diode, is selected to have a low terminal capacitance-to-size ratio and to have a fast rise time. Rise time is proportional to the transit time of holes or electrons across the PIN junction. Photo-diode 302 is coupled to a reverse bias voltage source 304 and to a trans-impedance amplifier 306 as illustrated. Trans-impedance amplifier 306 includes an op-amp 308 that is operable to convert a variable current input 310 from the photo-diode 302 into an amplified variable voltage output 312. Op-amp 308 is selected to have relatively low input capacitance and a relatively high gain-bandwidth product. One op-amp that meets these criteria is model THS4271D sold by TEXAS INSTRUMENTS. Several other commercially available op-amps are similarly well suited.

According to one embodiment, the bias voltage delivered from the bias voltage source is between about 40 volts and 200 volts. Conventional PIN photo-diodes are typically biased with a voltage that is less than about 30 volts. Thus, according to the presently described embodiment, the bias voltage used by the large area PIN photo-diode is significantly greater than conventionally biased PIN photo-diodes. Conventional avalanche photo-diode (APD) circuits typically use a bias voltage in a range of about 500 volts to about 2000 volts. The presently described example circuit has a bias voltage of about 40 volts to 200 volts used by a large area PIN photo-diode, which is significantly less than that for a typical avalanche photo-diode (APD) circuit.

The bandwidth of the trans-impedance amplifier 306 is roughly determined according to the formula $BW=1/(2\pi RC)$, where BW is bandwidth in Hertz, R is the resistance of resistor 314 in ohms, and C is the capacitance of capacitor 316 in farads. Gain of the trans-impedance amplifier 306 is roughly equal to the value of resistor 316 in ohms. To minimize noise of the high terminal capacitance photo-diode 302, the capacitance of capacitor 316 is set relatively high. According to one embodiment the terminal capacitance of the photo-diode 302 is approximately 20 to 40 pico-Farads (pF) and the capacitance of capacitor 316 is selected to be equal to approximately 2 pF to 4 pF. Because the terminal capacitance of the photo-diode 302 is approximately 10 times the capacitance of capacitor 316, the noise gain of the circuit 301 is approximately equal to 10×.

For high bandwidth applications, the product of the resistance R of resistor 314 times the capacitance C of capacitor 316 is selected to be low. Since the capacitance of capacitor C is set to a relatively high value, for example 2 pF to 4 pF to better balance the terminal capacitance of the photo-diode, the resistance R of resistor 314 is set to a relatively low value, for example around 2000 ohms, to select a high bandwidth. Thus, for the present example, the signal gain of the trans-impedance amplifier 306 is set to about 2000× to produce a bandwidth of about 40 MHz. The first-stage gain is thus lower than is typical for many photo detection circuits, with a higher than typical system gain being provided by a larger proportion of photons being collected by the larger than typical active area.

Thus, according to some embodiments, a photo-diode having a high terminal capacitance of about 20 pF to 500 pF is used in a high bandwidth photo-detection circuit compared to typical circuits that use PIN photo-diodes having a terminal capacitance of about 5 pF to 15 pF for bandwidths greater than about 1 MHz. According to another embodiment one could use 20 pF to 80 pF photo-diode terminal capacitance in a system having a bandwidth greater than about 20 MHz.

Resistor 314 can be any appropriate circuit that is arranged to provide a desired resistance value including passive and/or active circuits. The desired resistance value may be fixed or variable, which may be provided by a series circuit, a parallel circuit, or any appropriate combination of series and parallel circuits. Example resistor circuits include at least one of: a fixed value resistor, a variable value resistor, a transistor that is arranged to operate as a resistor, and any other appropriate combination of passive and or active circuits that are configured to provide a desired resistance value.

FIG. 3B is a block diagram illustrating a plurality of amplification stages made according to an embodiment. A relatively high terminal capacitance photo-diode such as a large area PIN photo-diode 302 is operatively coupled to a first stage trans-impedance amplifier 306 as described above. Second stage amplifier 318 is configured to receive output 312 from trans-impedance amplifier 306, amplify the received signal, and provide the amplified signal as an output that is coupled to the next stage. Similarly, third and fourth amplifier stages 320 and 322 respectively further amplify and/or condition their respective received signals to produce an output signal 324.

The number of subsequent amplifier stages 318 through 322 may be varied according to the application. Amplification stages may be DC coupled, AC coupled, and/or use other types of coupling. According to an embodiment, subsequent amplifier stages 318 through 322 are voltage amplifiers. According to some embodiments, subsequent amplifier stages 318 and 320 are AC coupled together via an AC coupling element.

Figure 3C:
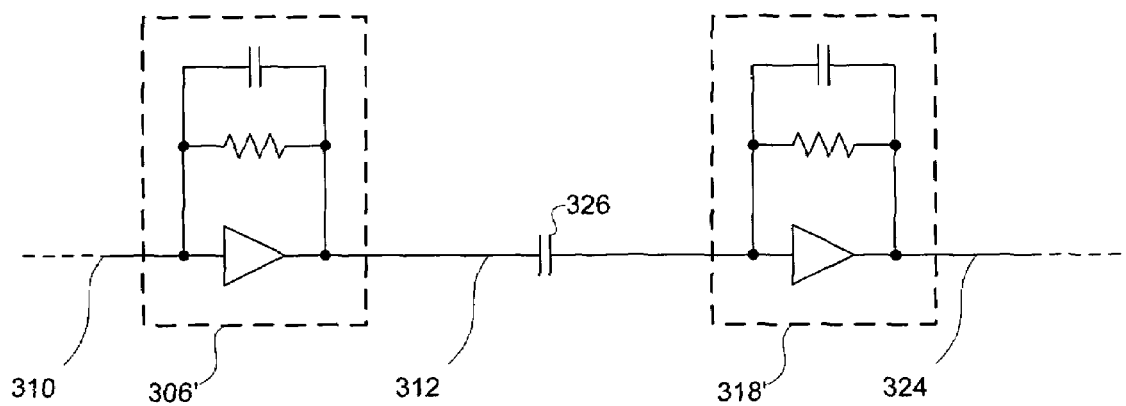
FIG. 3C schematically illustrates AC-coupled amplification stages using a first type of AC-coupling element according to an embodiment.

Referring to FIG. 3C, a TIA circuit 306', which is substantially similar in operation to circuit 306 previously described, is coupled to an element of a subsequent amplification stage 318', which is substantially similar in operation to circuit 318 previously described, through an AC coupling element 326. According to the illustrated embodiment, the AC coupling element 326 may for example be an AC coupling capacitor. AC-coupled amplified signal 324 is produced by subsequent amplification stage 318.

Figure 3D:
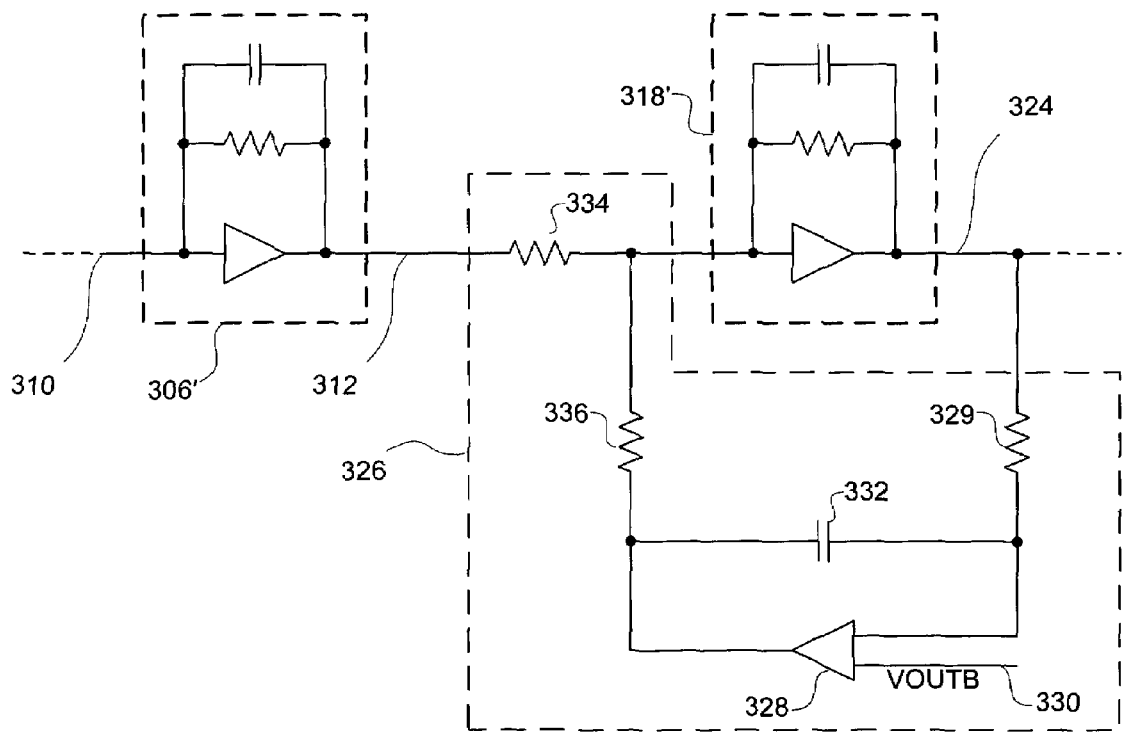
FIG. 3D schematically illustrates AC-coupled amplification stages using a second type of AC-coupling element according to an embodiment.

FIG. 3D illustrates another type of AC coupling element 326 for coupling a TIA circuit 306' to an element of a subsequent amplification stage 318' according to another embodiment. The AC coupling element 326 may be in the form of a negative feedback circuit that comprises an amplifier configured as an integrator 328 coupled to the output signal 324 through a resistor 329 and a desired average output voltage VOUTB$_t$. A capacitor 332 and the resistor 329 determine a cut-off frequency for the AC coupling amplification element 306 to amplification element 318. Resistors 334 and 336 form a summing circuit. The AC coupling circuit 326 of FIG. 3D may have an advantage in providing a very tightly controlled average output voltage on the amplifier output 324.

According to some embodiments, trans-impedance amplifier 306 is configured to provide a gain of about 2000× and subsequent amplifier stages 318 through 322 are configured to collectively provide a gain of about 100×, yielding a total gain from the large area photo-diode 302 to the output 324 of about 200,000×. Thus, according to some embodiments, less gain is provided by the first stage trans-impedance amplifier (e.g., about 500× to 10,000×) and more gain is provided by the subsequent amplification stages (e.g., about 50× to 1000×) to provide about 1 MHz or greater bandwidth from a large area photo-diode. The first and second amplifier stages each have a respective gain factor, where the first gain factor is less than that for a conventional circuit, and where the relationship between the first gain factor and the second gain factor is on the order of, for example, 1:1, 5:1, 10:1, 15:1, 20:1, 100:1, etc. In contrast, a conventional PIN photo-diode photo detection circuits typically uses a first stage gain on the order of 50,000× to 500,000×, and subsequent gain of about 5× to 20×, while using a small area PIN photo-diode to the output for a resulting bandwidths that is below about 100 KHz.

Figure 4:
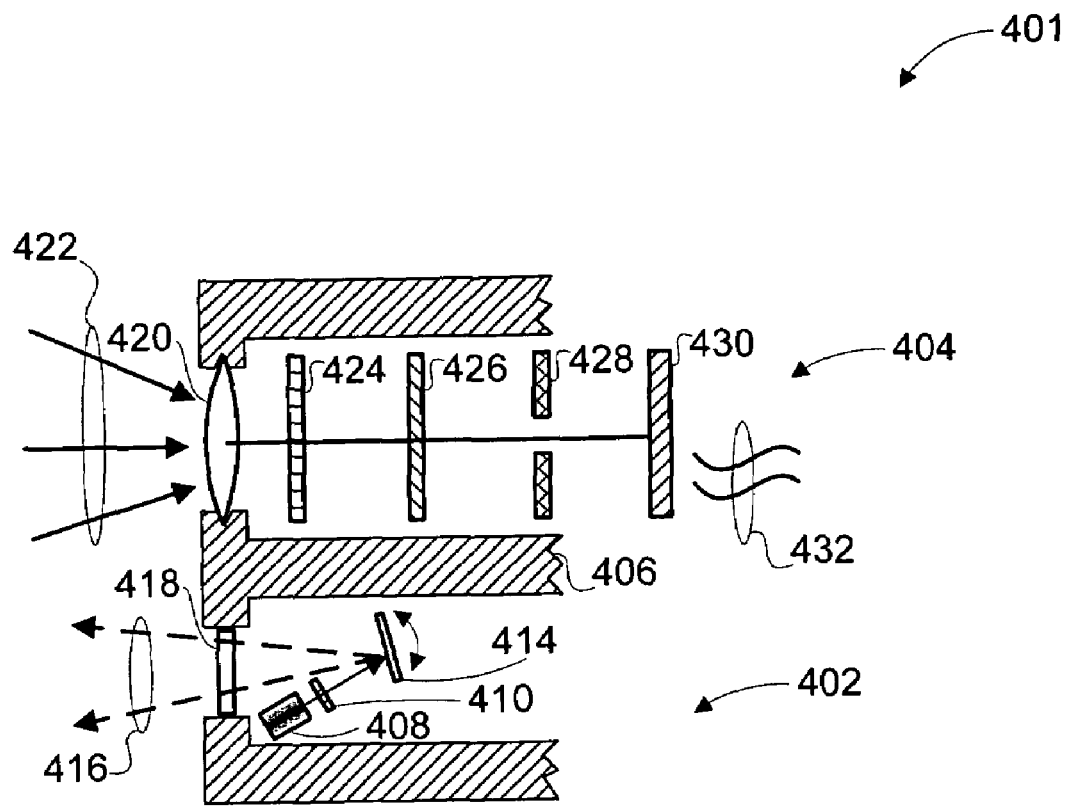
FIG. 4 is a block diagram of a monochrome staring detector subsystem according to an embodiment.

FIG. 4 is a block diagram showing a scanned beam image capture system 401 having a beam scanner subsystem 402 and a staring detector subsystem 404 mounted in a housing 406. The beam scanner subsystem 402 includes a light emitter 408 that cooperates with optional beam shaping optics 410 to project a beam of light 412 toward a scan mirror 414. Scan mirror 414 produces a scanned beam 416 that passes through an optional window 418 to scan a field-of-view external to the housing 406.

Staring detector 404 includes an optional light gathering optical member 420, here illustrated as a lens, operative to gather light 422 from the field-of-view. Optional first filter 424 and optional second filter 426 cooperate to exclude light that does not correspond to a wavelength generated by light source 408, or alternatively to exclude wavelengths that do not correspond to an emission stimulated by the wavelength of light generated by light source 408. Optional aperture 428 is operative to exclude light that does not come from within the field-of-view scanned by scanned beam 416. Optical elements 420, 424, 426, and 428 may be configured to gather as much light as possible from the field-of-view while excluding light from outside the field-of-view and excluding light not operatively associated to the scanned beam of light 416, such as ambient light. Large area PIN photo-diode 430 is positioned to receive the desired light and operable to convert the received light to an electrical signal. The electrical signal is coupled to trans-impedance amplification circuitry via an electrical coupling 432. According to some embodiments, a lead associated with electrical coupling 432 corresponds to electrical connection 310 from FIGS. 3A and 3B.

According to some embodiments, window 418 may be configured to extend across the light collection region 420 of the staring detector subsystem. Window 418 may further be treated or selected to exclude wavelengths of light (such as by absorbing or reflecting undesirable wavelengths) in a manner similar to optional filters 424 and 426. Thus, the use of a wavelength excluding window 418 that extends over the light collection area of the staring photo-detector may be used advantageously to eliminate the need for one or more of the optional filters 424 and 426. Moreover, according to some embodiments, housing 406 may be extended to provide an aperture function. In such cases, housing 406 may produce an effect functionally equivalent to optional aperture 428 and may be used advantageously to eliminate the need for optional aperture 428.

According to an embodiment, the beam scanner 414 is a MEMS type beam scanner having a mirror size of about 500 micrometers to 5 millimeters across. According to an embodiment, the beam scanner 414 is operable to scan a two-dimensional field-of-view approximating VGA or SVGA or higher resolution at a relatively high frame rate of 20 to 60 or greater Hertz. According to an embodiment, the relatively high scan rate makes it desirable to use a relatively high bandwidth photo-detector 430. At the same time, the relatively small size of the scan mirror or other considerations may make it desirable to use a staring photo-detector rather than a retro-reflected (descanned) light path to the photo-detector. According to some embodiments, it is desirable to limit the optical output power of the light source 408 and/or to provide a favorable laser safety classification for the system 401. According to some embodiments, the use of a high intrinsic gain photo-detector such as an APD along with its high voltage power supply is undesirable, particularly where it is desirable to reduce the cost and the physical size of the image-capture system. According to some embodiments, several of these and other factors may combine to make a large area PIN photo-detector advantageous.

Figure 5:
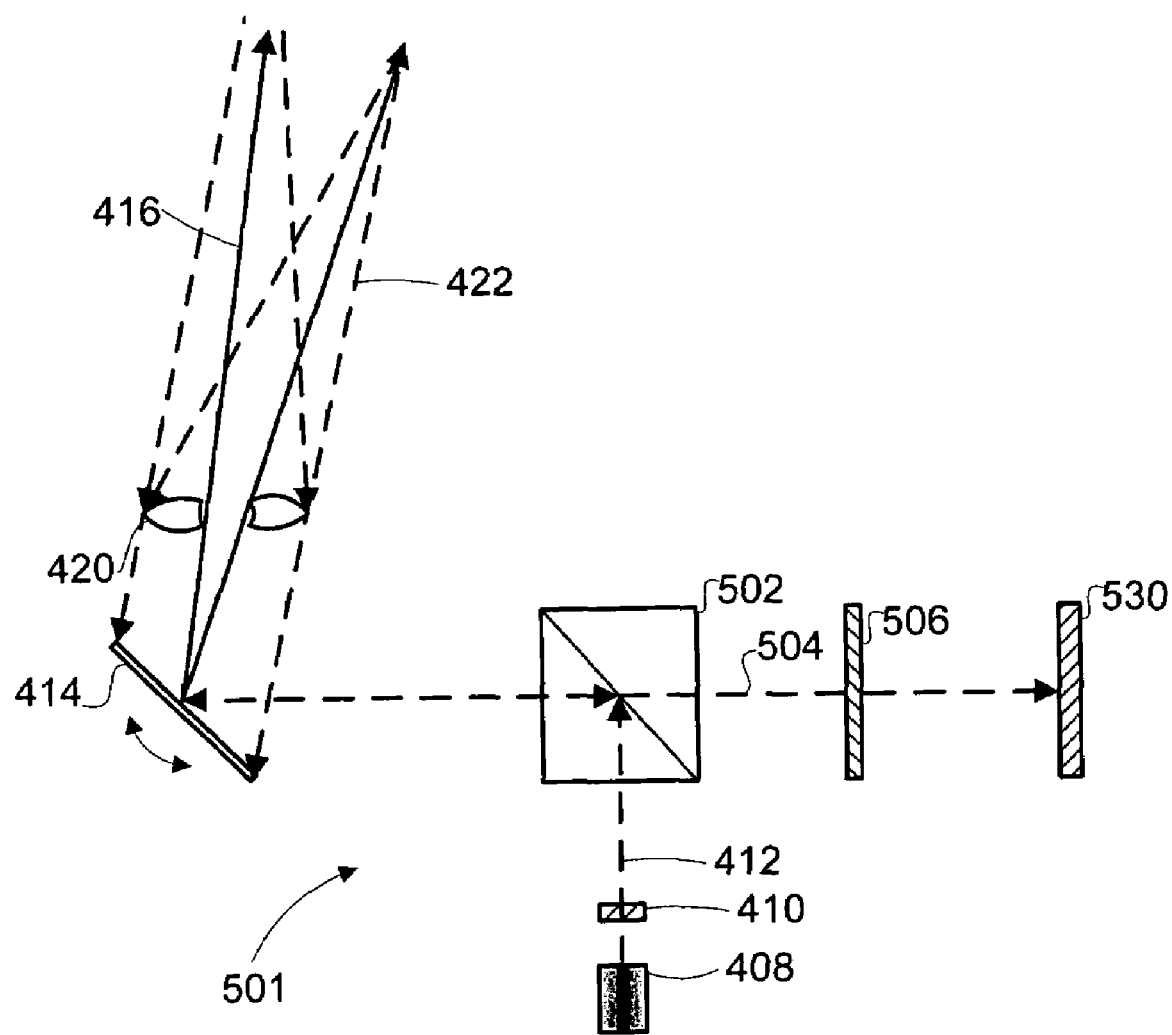
FIG. 5 is a block diagram of a monochrome retro-reflected (descanned) detector subsystem according to an embodiment.

FIG. 5 is a block diagram illustrating a retro-reflected (descanned) detector subsystem 501. The light source 408 and the beam shaping optics 410 project a beam through a beam splitter 502, which is arranged to reflect the generated beam toward, scan mirror 414. Scan mirror 414 is configured to produce scanned beam 416. Light 422 is received from the field-of-view through collection optics 420, and is descanned by the scan mirror 414 into the beam splitter 502. At least a portion of the light received by the beam splitter 502 is passed through the beam splitter 502 as received light 504 (the central ray being shown) toward optional filtering optics 506, which may for example include filters 424 and 426 and aperture 428. Light passing through optional filtering optics 506 impinges upon the large area PIN photo-diode 430, which is operable to convert the received light energy into an electrical signal.

The retro-reflective detection system of FIG. 5 is operative to collect light at and around the spot produced in the field-of-view by the scanned beam 416 and track the spot as it moves across the field-of-view. Thus the retro-reflective detection system is operative to provide spatial filtering of the returned light 422 to exclude additional light not reflected from the illuminated spot.

Figure 6:
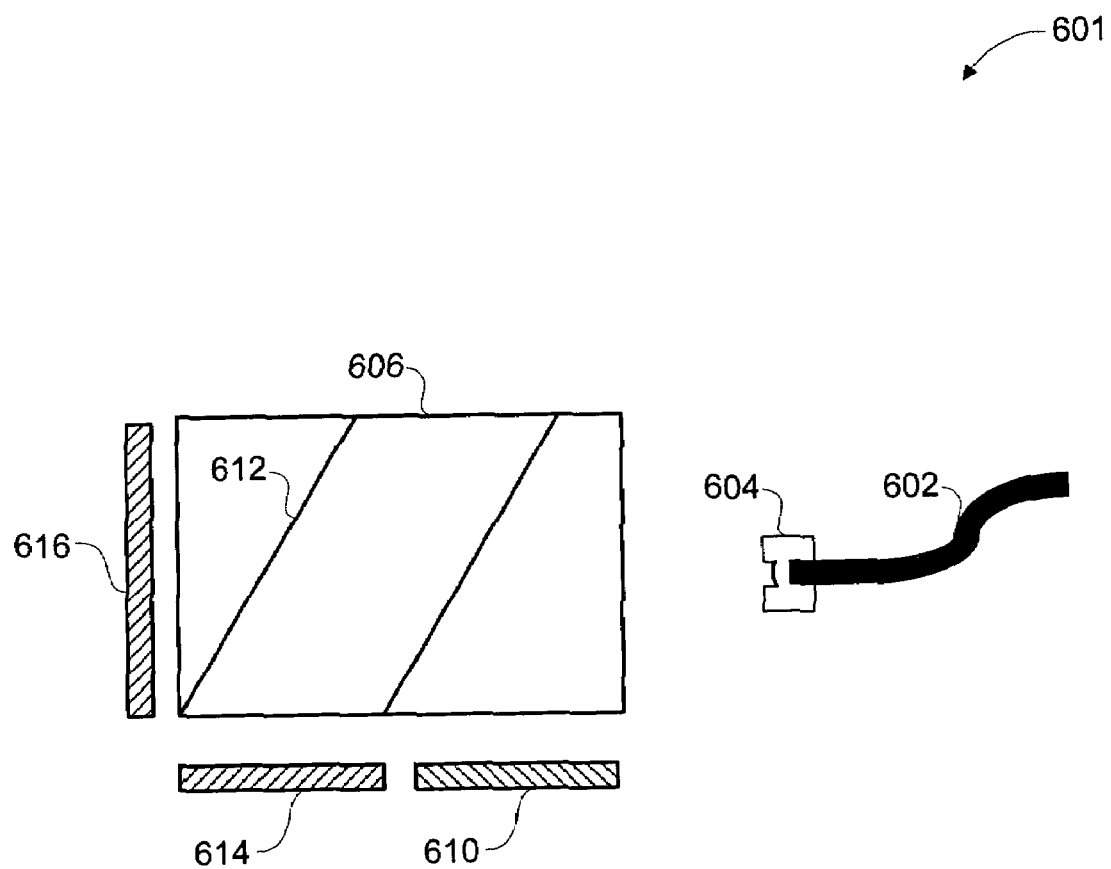
FIG. 6 is a block diagram of a multi-wavelength detector subsystem according to an embodiment of the present disclosure.

FIG. 6 is a block diagram of a multi-wavelength detector subsystem 601. The example system of FIG. 6 is arranged to receive light through an optical fiber 602 from a distal field-of-view. Alternatively, light may be received directly from the field-of-view or through other indirect means. Light passes from the end of the optical fiber 602 through a fiber coupler 604 and enters a beam splitter 606. Example beam splitter 606 includes a first surface 608 operative to reflect light at a first wavelength toward a first photo-detector 610. Light at other wavelengths passes through surface 608 and impinges upon second surface 612. Second surface 612 is operative to reflect light at a second wavelength toward second photo-detector 614. Light not at the first or second wavelengths pass through second surface 612 and impinge upon third photo-detector 616. Thus, received light having three component wavelengths, for example Red, Green, and Blue, is split into the three component wavelengths and directed to impinge upon respective photo-detectors 610, 614, and 616. One or more of the photo-detectors 610, 614, and 616 may be a large area photo-diode. The areas of each photo-diode may be different from one another, the same as one another, or any combination thereof. Moreover, plural types of photo-detectors such as PIN photo-diodes, APDs, PMTs, photovoltaic coupled devices, etc. may be combined to form a heterogeneous array of photo-detectors 610, 614, and 616. Additionally, the number of wavelengths and the number of photo-detectors may be varied as may be desired for the particular optical design of the collector(s) and/or optional splitter(s). One or more large area PIN photo-diodes may be used as wavelength measurement elements such as elements in a spectrometer. Also, light multiplication devices such as an image intensifier may be coupled to a large area PIN photo-diode.

Although the invention has been described herein by way of exemplary embodiments, variations in the structures and methods described herein may be made without departing from the spirit and scope of the invention. For example, the positioning of the various components may be varied. Individual components and arrangements of components may be substituted as known to the art. Since many embodiments of the invention can be made without departing from the spirit and scope of the invention, the invention is not limited except as by the appended claims.

What is claimed is:

1. A scanned beam image capture device, comprising:
   a light beam source operable to provide a light beam;
   scanner operable to scan the light beam along at least one axis defining a field-of-view to produce scattered light from the field-of-view;
   a photo-detector circuit that is arranged to receive at least a portion of the reflected light from a target object, wherein the photo-detector circuit comprises a large area PIN diode that is arranged to provide an electrical signal in response to the portion of reflected light, and wherein the large area PIN diode has an active area that is greater than or equal to about 25 square millimeters; and
   an interface circuit that is arranged to provide the electrical signal to another device.

2. The scanned beam image capture device of claim 1, wherein the light beam source comprises at least one of: an ambient light source, a visible light source, an infrared light source, a laser diode, and a light emitting diode (LED).

3. The scanned beam image capture device of claim 1, wherein the scanner comprises at least one of: a mechanical scanning device, an electrical scanning device, an optical scanning device, a Micro Electro-Mechanical System (MEMS) scanning device, a mirror, and a lens.

4. The scanned beam image capture device of claim 1, further comprising: a controller block that is arranged to process the electrical signal based on a predetermined algorithm and provide another signal in response to the electrical signal to the other device.

5. The scanned beam image capture device of claim 4, wherein the other signal corresponds to one of: an analog signal and a digital signal.

6. The scanned beam image capture device of claim 1, wherein at least one of the light beam source and the photo-detector circuit are triggered by at least one of: a user initiated action, a scheduled action, a periodic trigger signal, and an externally provided trigger signal.

7. The scanned beam image capture device of claim 1, the photo-detector circuit further comprising at least one of: a low input capacitance amplifier circuit and a high gain amplifier circuit such that a gain-bandwidth product associated with the photo-detector circuit is at least 25 MHz.

8. The scanned beam image capture device of claim 1, the photo-detector circuit comprising a trans-impedance amplifier circuit that has an input capacitance that is least a factor of 10 less than a terminal capacitance that is associated with the large area PIN diode.

9. A method for capturing an image with an image capture device, the method comprising:
   providing a light beam to a scanner;
   scanning the light beam with the scanner along at least one axis defining a field-of-view to produce scattered light from the field-of-view;
   detecting at least a portion of light that is reflected from a target object in the field-of-view with a large area PIN diode, wherein the large area pin diode has an active area that is greater than approximately 25 square millimeters;
   providing an electrical signal from the large area PIN diode in response to the at least a portion of the detected light; and
   amplifying an electrical signal from an output of the large are PIN diode to provide an amplified signal with a signal bandwidth that is greater than approximately 1 MHz.

10. The method of claim 9, further comprising: collecting light that is reflected from the target object, and impinging the collected light onto the large area PIN diode.

11. The method of claim 9, further comprising: filtering light that is reflected from the target object, and impinging the filtered light onto the large area PIN diode.

12. The method of claim 9, further comprising: filtering light that is reflected from the target object such that at least one wavelength of light that is received by device is blocked from detection by the large area PIN diode.

13. The method of claim 10, further comprising: coupling light that is reflected from the target to the large area PIN diode by at least one of: a lens, a filter, an aperture, an optical fiber, and a beamsplitter.

14. A method for capturing an image with an image capture device, the method comprising:
provviding a light beam to a scanner;
scanning the light beam with the scanner along at least one axis defining a field-of-view to produce scattered light from the field-of-view;
detecting a first portion of light that is reflected from a target object in the field-of-view with a first large area PIN diode, wherein the first large area pin diode has an active area that is greater than approximately 25 square millimeters;
detecting a second portion of light that is reflected from a target object in the field-of-view with a second large area PIN diode, wherein the second large area pin diode has an active area that is greater than approximately 25 square millimeters;
providing a first electrical signal from the first large area PIN diode in response to the first portion of the detected light, wherein the first electrical signal indicates light from a first range of wavelengths;
providing a second electrical signal from the second large area PIN diode in response to the second portion of the detected light, wherein the second electrical signal indicates light from a second range of wavelengths;
amplifying the first electrical signal to provide a first amplified signal with a signal bandwidth that is greater than approximately 1 MHz; and
amplifying the second electrical signal to provide a first amplified signal with a signal bandwidth that is greater than approximately 1 MHz.

15. The method of claim 14, wherein the first range of wavelengths overlaps the second range of wavelengths.

16. The method of claim 14, further comprising: filtering reflected light from the target to provide the first portion of light, and filtering reflected light from the target to provide the second portion of light.

17. The method of claim 14, further comprising: coupling reflected light from the target to a beam splitter, providing the first portion of reflected light to the first large area PIN diode from a first surface of the beam splitter, and providing the second portion of reflected light to the second large area PIN diode from a second surface of the beam splitter.

18. A scanned beam image capture system, comprising:
a means for producing an incident beam of light;
a means for scanning the beam of light across a target object in a field-of-view such that a reflected beam of light is produced;
a means for detecting at least a portion of the reflected beam of light, wherein the means for detecting includes at least one large area photo-diode with an active area of at least 25 square millimeters; and
a means for amplifying an output current associated with the means for detecting to provide an output signal that is associated with the portion of the reflected beam of light, wherein a signal bandwidth associated with the output signal is greater than approximately 1 MHz.

* * * * *